US010682588B2

(12) United States Patent
Gohel et al.

(10) Patent No.: US 10,682,588 B2
(45) Date of Patent: Jun. 16, 2020

(54) MODULAR HEAT EXCHANGER, MOISTURE SEPARATOR AND PULSATION DAMPENER FOR A MULTI-STAGE FLUID COMPRESSOR

(71) Applicant: Ingersoll-Rand Company, Davidson, NC (US)

(72) Inventors: Hardik Vinodbhai Gohel, Gujarat (IN); P. Prabhu, Gujarat (IN); Mahesh Kumar.K.R, Gujarat (IN); Vishal Umashanker Gupta, Gujarat (IN); Shambhu M Vaghani, Gujarat (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 295 days.

(21) Appl. No.: 15/787,069

(22) Filed: Oct. 18, 2017

(65) Prior Publication Data
US 2019/0111359 A1 Apr. 18, 2019

(51) Int. Cl.
*B01D 5/00* (2006.01)
*F16L 55/04* (2006.01)
(Continued)

(52) U.S. Cl.
CPC ......... *B01D 5/0003* (2013.01); *B01D 5/0015* (2013.01); *F04B 39/0055* (2013.01); *F04B 39/0061* (2013.01); *F04B 39/16* (2013.01); *F04B 41/06* (2013.01); *F04C 29/0035* (2013.01); *F04C 29/0092* (2013.01);
(Continued)

(58) Field of Classification Search
CPC . B01D 5/0003; B01D 5/0015; F04B 39/0055; F04B 39/0061; F04B 39/16; F04B 41/06; F04C 29/0035; F04C 29/0092; F04C 29/065; F25B 1/10; F25B 2400/23; F25B 2400/075; F25B 2400/071; F25B 2400/072; F25B 2400/074; F25B 2500/14; F25B 2500/12; F16L 55/041; F16L 55/02718; F16L 55/02736
See application file for complete search history.

(56) References Cited
U.S. PATENT DOCUMENTS 1,088,187 A * 2/1914 Theisen ................ B01D 46/10
55/355
3,876,401 A * 4/1975 Sturgill .................. B01D 46/00
55/481
(Continued)

FOREIGN PATENT DOCUMENTS
EP 1715238 A2 10/2006

*Primary Examiner* — Joseph F Trpisovsky
(74) *Attorney, Agent, or Firm* — Taft, Stettinius & Hollister LLP

(57) ABSTRACT

An aspect of the present disclosure includes a multi-stage compressor having a low pressure compressor stage and a high pressure compressor stage operable for compressing a working fluid. An integrated device including a heat exchanger directly connected to a combination unit is operable for reducing pressure pulsations, cooling and separating moisture in a first compressed flow stream and a second compressed flow stream discharged from the low pressure stage and the high pressure stage respectively. A first pressure pulsation dampener, a first moisture separator, a second pressure pulsation dampener and a second moisture separator are integrally formed within the combination unit.

10 Claims, 7 Drawing Sheets

(51) Int. Cl.
*F04C 29/06* (2006.01)
*F04B 39/00* (2006.01)
*F04B 41/06* (2006.01)
*F04B 39/16* (2006.01)
*F04C 29/00* (2006.01)
*F16L 55/027* (2006.01)
*F04C 18/16* (2006.01)

(52) U.S. Cl.
CPC .......... *F04C 29/065* (2013.01); *F16L 55/041* (2013.01); *F04C 18/16* (2013.01); *F16L 55/02718* (2013.01); *F16L 55/02736* (2013.01)

(56) References Cited

U.S. PATENT DOCUMENTS

| | | |
|---|---|---|
| 4,237,696 A | 12/1980 | Coblentz |
| 4,303,372 A * | 12/1981 | Caffrey .............. G05D 16/0655 415/1 |
| 4,957,517 A | 9/1990 | Linnert |
| 5,957,664 A | 9/1999 | Stolz et al. |
| 6,726,752 B2 * | 4/2004 | Chen ...................... B01D 53/26 55/319 |
| 2015/0198149 A1 | 7/2015 | Lucas et al. |
| 2018/0172195 A1 * | 6/2018 | Schulze-Beckinghausen .............. F16L 55/041 |

* cited by examiner

US 10,682,588 B2

MODULAR HEAT EXCHANGER, MOISTURE SEPARATOR AND PULSATION DAMPENER FOR A MULTI-STAGE FLUID COMPRESSOR

TECHNICAL FIELD

The present application generally relates to industrial air compressor systems and more particularly, but not exclusively, to a multi-stage compressor with a modular integrated heat exchanger, moisture separator and pressure pulsation dampener.

BACKGROUND

Industrial compressor systems are configured to produce large volumes of pressurized fluid such as air or the like. Certain types of compressors such as rotary screw compressors generate pressure pulsations in the working fluid that may be perturbated downstream of the compressor. The pressure pulsations produce noise and undesirable vibration in the compressor system.

Multi-stage compressor systems can include interstage cooling to increase the efficiency of the compressor and a moisture separator can be used to separate condensed liquid from the cooled compressed working fluid. Some existing systems have various shortcomings, drawbacks, and disadvantages relative to certain applications such as excessive space claim and undesirable external fluid conduits for routing certain fluids from one component to another. Accordingly, there remains a need for further contributions in this area of technology.

SUMMARY

One embodiment of the present application includes a modular heat exchanger with an integrated moisture separator and pressure pulsation dampener for a multi-stage compressor system. Other embodiments include apparatuses, systems, devices, hardware, methods, and combinations for an integrated device that includes a heat exchanger connected to a device having a combined moisture separator and pressure pulsation dampener for use with a multi-stage compressor system. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
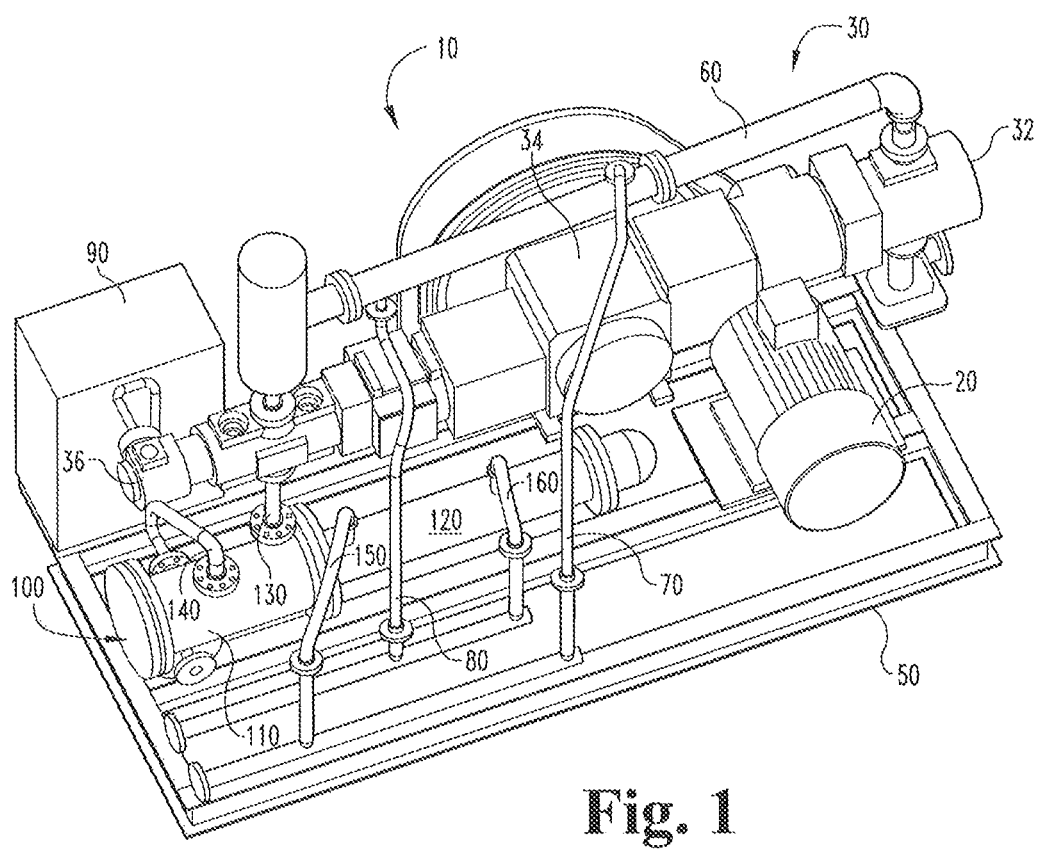
FIG. 1 is a perspective view of an exemplary compressor system according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems are configured to provide large quantities of compressed fluids at a desired temperature, pressure and mass flow rate. Some compressor systems include fluid to fluid heat exchangers to control the temperature of a compressed fluid at various stages within the system. The term "fluid" should be understood to include any gas or liquid medium used in the compressor system as disclosed herein. In one aspect the fluid can include mixtures of air and oil and can be separated into separate constituents in a separating tank. In one aspect, the present disclosure is directed to suppressing pressure pulsations and reducing noise in a working fluid that includes compressed air; however, it should be understood that when the term "air" is used in the specification or claims that other working fluids are included under a broad definition of compressible fluids. Also, when the term "oil" is used in the specification or claims, it should be understood that any lubrication fluid whether carbon based or synthetic in nature is contemplated herein.

The present application is generally a modular device directed to suppressing, reducing, and/or dampening pressure pulsations in a working fluid generated by a multi-stage compressor, cooling the working fluid and separating moisture from a low pressure stage flow and a relatively high pressure stage flow. While the terms low pressure and high pressure are used in the specification and claims, it should be understood that the multi-stage compressor may include two or more compressor stages, operably coupled with the integrated modular device as disclosed herein. Furthermore, in some embodiments the low pressure stage may be a second stage and the high pressure stage may be the third stage of a three stage compressor.

Referring to FIG. 1, a perspective view of a compressor system 10 according to one exemplary embodiment of the present disclosure is shown therein. The compressor system 10 can include multiple compressor stages as is illustrated. The compressor system 10 includes a primary motive source 20 such as an electric motor or the like. The compressor system 10 can include a compressor 30 with multi-stage compression and in the present form includes a first compressor stage 32, a second compressor stage 34 and a third compressor stage 36. While the exemplary embodiment includes three compression stages, it should be understood that the present disclosure can be directed to any type of multi-stage compressor system including two or more compression stages. In one form the fluid compressors are rotary screw compressors and in other forms the compressors can be centrifugal or other positive displacement devices as known to one skilled in the art.

The multi-stage compression system 10 can include a base 50 for supporting various components such as, by way of example and not limitation, the electric motor 20, multiple compressors 32, 34, 36 and various conduits 60, 70 and 80 operable for transporting various fluids throughout the system as would be known to one skilled in the art. A controller 90 can be operably connected to the compressor system 10 to control various aspects thereof such as valve and flow control, motor speed, temperatures and pressures of the fluid flow in the compressor system 10.

A modular integrated device 100 includes a combination unit 110 that includes a pressure pulse dampener and moisture separator directly connected to a heat exchanger 120. The modular integrated device 100 is operable for dampening pressure pulsations, cooling and separating moisture from two separate compressed working fluid flow streams. One of the compressed working fluid flow streams is generated by high pressure compressor stage and the other is generated by a low pressure compressor stage. It should be understood that the terms "low" and "high" are relative terms and not absolute in any sense. In one form, the lower pressure stage is a second stage compressor and the high pressure stage is a third stage compressor. However, other compressor forms may be utilized with the modular integrated device 100. The modular integrated device 100 includes a second stage working fluid inlet conduit 130, a third stage working fluid inlet conduit 140, a coolant inlet conduit 150 and a coolant outlet conduit 160. Other conduits directing a fluid to or from the integrated device 100, although not shown in this view, will be described in the following figures.

Figure 2:
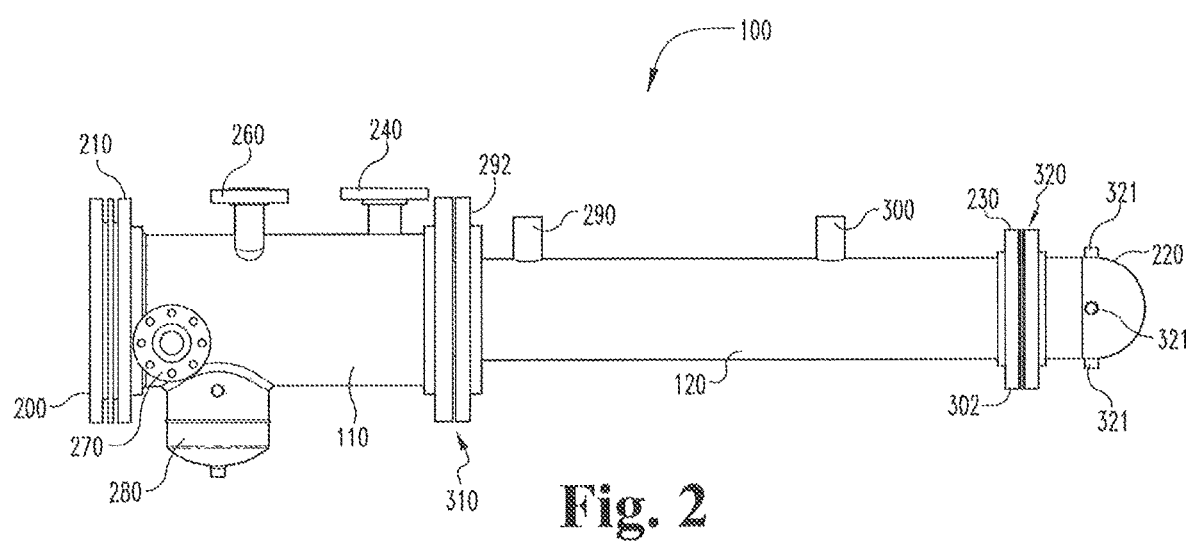
FIG. 2 is a perspective view of an integrated device including a heat exchanger directly connected to a combination unit having a pressure pulse dampener and moisture separator defined therein.

Referring now to FIG. 2, the modular integrated device 100 is shown in an enlarged perspective view. The modular integrated device 100 includes a cover plate 200 connected to the first end 210 of the modular integrated device 100. A dome cover 220 is connected to the modular integrated device 100 at the opposing second end 230. The combination unit 110 includes a low pressure stage working fluid inlet port 240, a low pressure stage working fluid outlet port 250 (not shown in this view), a high pressure stage working fluid inlet port 260, and a high pressure stage working fluid outlet port 270. Each of the ports 240, 250, 260 and 270 is fluidly connected with the combination unit 110. The combination unit 110 also includes a condenser reservoir 280 positioned along a bottom portion thereof to collect condensate removed from the compressed working fluid flow.

The heat exchanger 120 includes a coolant inlet port 290 proximate a first end 292. The heat exchanger 120 can also include a coolant outlet port 300 positioned proximate a second end 302 thereof. While the inlet port 290 and the outlet port 300 are illustrated in a vertically upward direction, it should be understood that the directional orientation of each port 290, 300 may vary in other embodiments. A flange connection 310 is configured to connect the heat exchanger 120 in a sealed fashion to the combination unit 110. The flange connection 310 can be connected with a plurality of fasteners as is conventional. One or more seals (not shown) can be operably positioned within the flange connection 310 to permit sealed fluid communication between the combination unit 110 and the heat exchanger 120. A second flange connection 320 is operable to connect the heat exchanger 120 and the dome cover 220 in similar fashion to the first flange connection 310. Various fasteners and seals can be used to form a fluid tight connection between the flange connections 310, 320. The dome cover 220 may have one or more ports 321 to act as vent or drain conduits in some embodiments. The ports 321 may be oriented in any direction, but in general the drains will be angled downward and the vents will be angled upward relative to the heat exchanger 120.

Referring now to FIGS. 3, 4, 5 and 6, various perspective views of the combination unit 110 are illustrated to provide further understanding of the operable features therein. The combination unit 110 extends from a first end 330 to a second end 340. The first end 330 includes a first flange 350 extending radially outward therefrom and the second end 340 includes a second end flange 360 extending radially outward therefrom. The condenser reservoir 280 can include a first drain port 370 for the low pressure stage compressor flow and a second drain port 380 configured to drain liquid that has been separated from the low and high pressure flow streams, respectively.

The combination unit 110 includes a housing shell 400 extending between the first and second ends 330, 340. A hollow internal bore 410 is formed within the housing shell 400. The internal bore 410 can be separated into a plurality of sectors by a first partition wall 420 and a second partition wall 430 extending from one side of the internal bore 410 to an opposing side of the internal bore 410. In the exemplary embodiment, the first partition wall 420 can be formed in a substantially horizontal direction and the second partition wall 430 can extend vertically from the top of the internal bore 410 to the bottom of the internal bore 410. While the disclosed embodiment illustrates horizontal and vertical partition walls 420, 430, it should be understood that other orientations are contemplated herein. The first and second partition walls 420, 430 are configured to form four separate sectors or quadrants within the housing shell 400. The quadrants may be different sizes and rotated at any desired angle relative to the housing shell 400.

Figure 4:
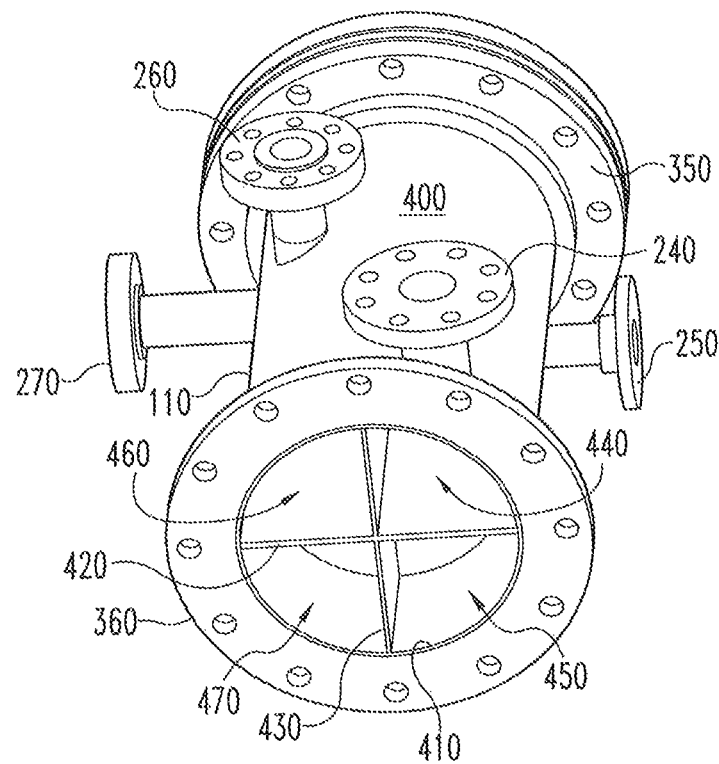
FIG. 4 is another perspective view of the combination unit of FIG. 2.

Referring more particularly to FIG. 4, the first and second partition walls 420, 430 operate to form a first quadrant compartment 440, a second quadrant compartment 450, a third quadrant compartment 460 and a fourth quadrant compartment 470. The first quadrant compartment 440 includes a pressure pulse dampener for the low pressure stage compressed working fluid flow. The second quadrant compartment 450 includes a moisture separator for the low pressure stage compressed working fluid flow after the low pressure stage compressed working fluid flow has been passed through the heat exchanger 120. The third quadrant compartment 460 includes a pressure pulse dampener for the high pressure stage compressor working fluid flow that is discharged from a high pressure stage compressor and the fourth quadrant compartment 470 includes a moisture separator for the high pressure stage compressed working fluid flow after exiting from the heat exchanger 120. This will be described in more detail below.

Figure 5:
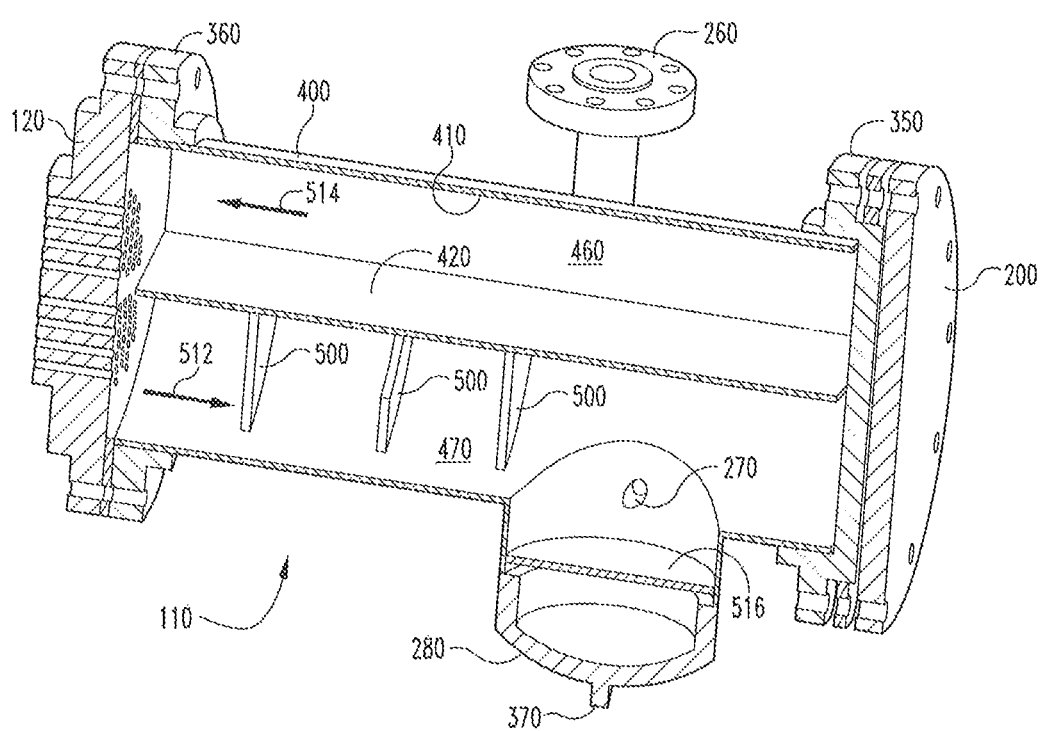
FIG. 5 is a perspective view of the combination unit of FIG. 2 partially cut-away to show internal portions thereof.
Figure 6:
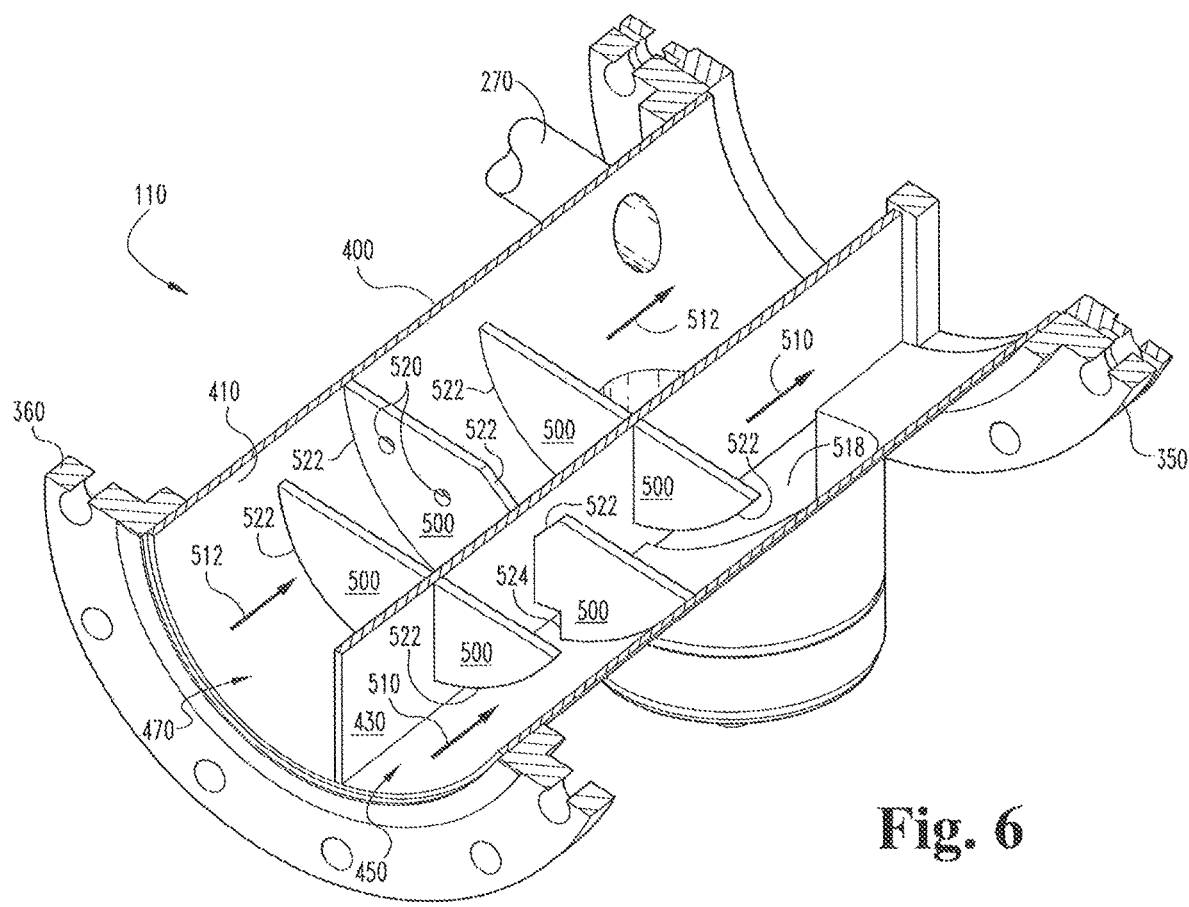
FIG. 6 is another perspective view of the combination unit of FIG. 2 partially cut-away to show internal portions thereof.

Referring now more particularly to FIGS. 5 and 6, the combination unit 110 is illustrated in perspective views partially cut-away to show internal features therein. The combination unit 110 can include one or more baffles 500 to deflect the low pressure and high pressure flow streams of compressed working fluid represented by arrows 510 and 512, respectively. The baffles 500 facilitate separation of condensed liquid from the compressed working fluid streams 510, 512 (FIG. 6). The baffles 500 may include various features such as through holes 520, angled walls 522, notched portions 524, etc., to cause turbulence and general streamline disruption of the working fluid flowpaths. The fluid flow in the second quadrant 450 is illustrated by arrows 510 that are representative of the stream-line flow of compressed working fluid from the low pressure stage compressor after exiting heat exchanger 120. The working fluid flow 510 will impinge upon the upstream surface 522 of the baffles 500 and deflect to flow in a tortuous path so as to facilitate separation of condensed liquid from the compressed working fluid. The fourth quadrant 470 receives stream-line working fluid from the heat exchanger 120 represented by arrows 512. The working fluid will flow along a tortuous path past each baffle 500 downstream towards the first end 330 of the combination unit 110, in similar fashion as to the flow in the second quadrant 450.

A horizontal condenser plate 516 (FIG. 5) is extended across the fourth quadrant portion of the condenser reservoir 280 to prevent the flow of high pressure working fluid from entering into a lower region of the condenser reservoir 280 and mixing with the low pressure working fluid. A vertical condenser plate 518 (FIG. 6) extends downward from the second partition wall 430 to engage with the horizontal condenser plate 516. The vertical condenser plate 518 and horizontal condenser plate 516 prevent mixing of the low pressure and high pressure working fluid flow streams while permitting condensate from the low pressure flow stream to drain to the bottom of the condenser reservoir 280 and condensate from the high pressure flow stream to drain down to the horizontal condenser plate 516.

Figure 3:
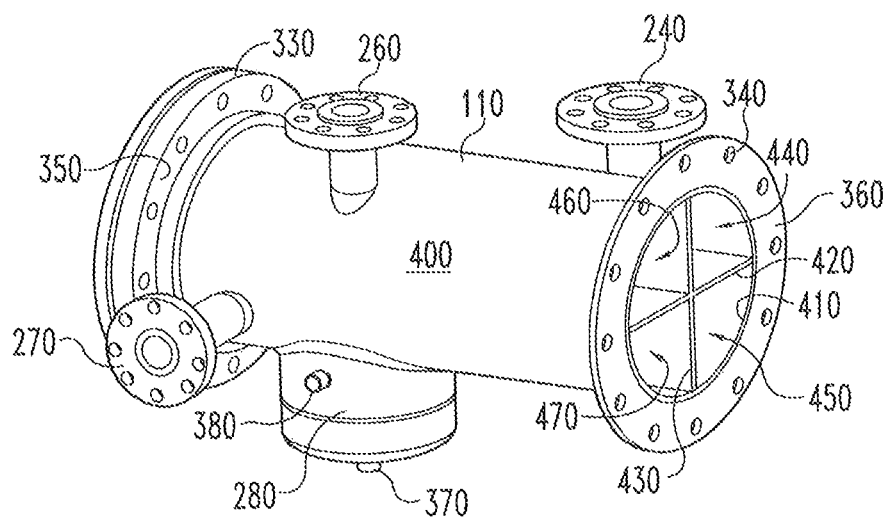
FIG. 3 is an enlarged perspective view of the combination unit shown in FIG. 2.

After the condensed moisture is separated from the high pressure compressed working fluid and drained into the condensate reservoir 280, the working fluid will continue to the third stage outlet port 270. When the condensate reservoir 280 is full, the compressed working fluid can be drained through the drain ports 370, 380 as illustrated in FIG. 3.

FIG. 5 also shows a view of the third quadrant 460 that includes a volume expansion from the high pressure inlet 260 to define the pressure pulse dampener for the high pressure fluid flow stream represented by arrow 514. The first quadrant 440 for the low pressure working fluid, although not shown, is similar to the third quadrant 460.

Figure 7:
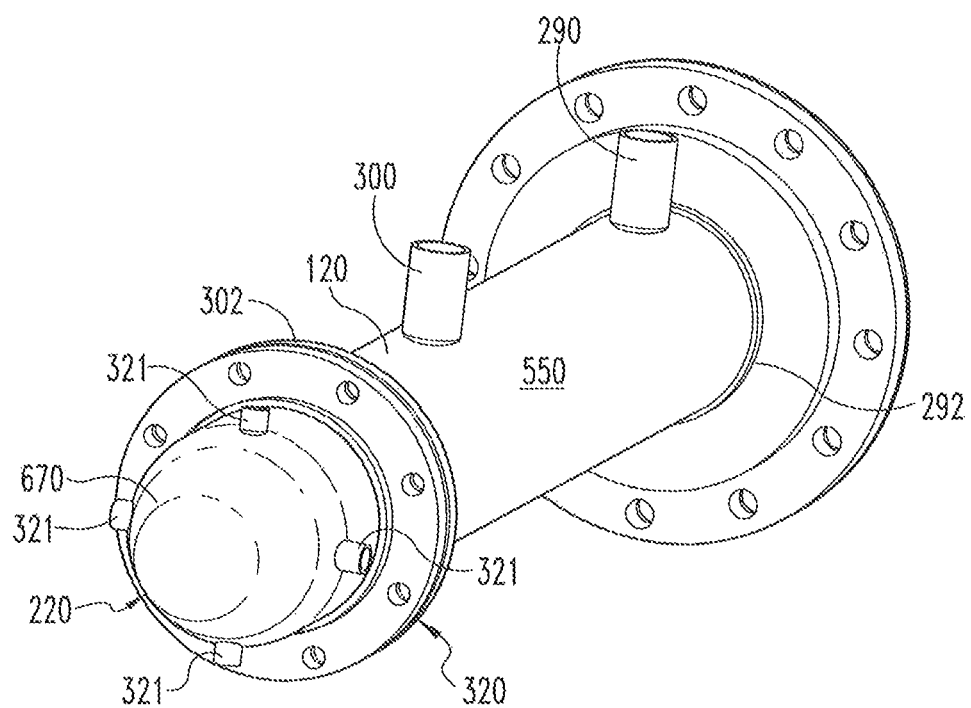
FIG. 7 is a perspective view of the heat exchanger portion of the integrated device of FIG. 2.
Figure 8:
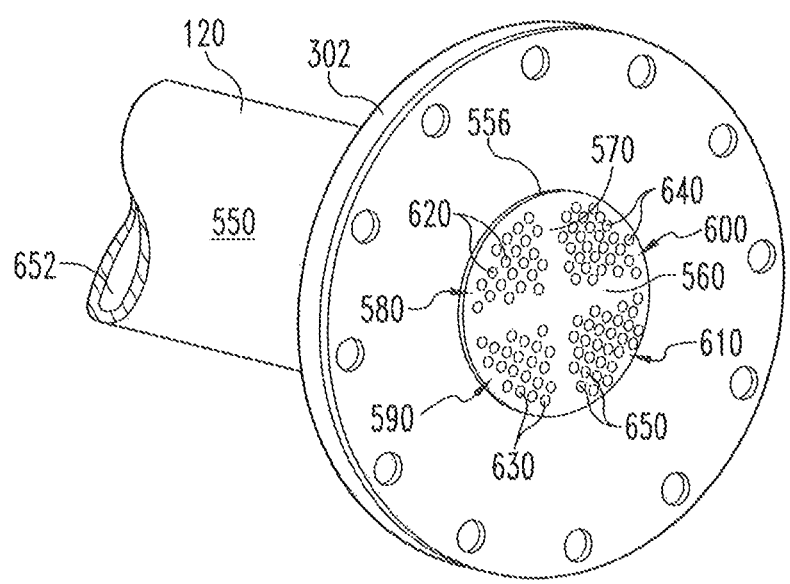
FIG. 8 is a perspective view of a first end of the heat exchanger of FIG. 7.
Figure 9:
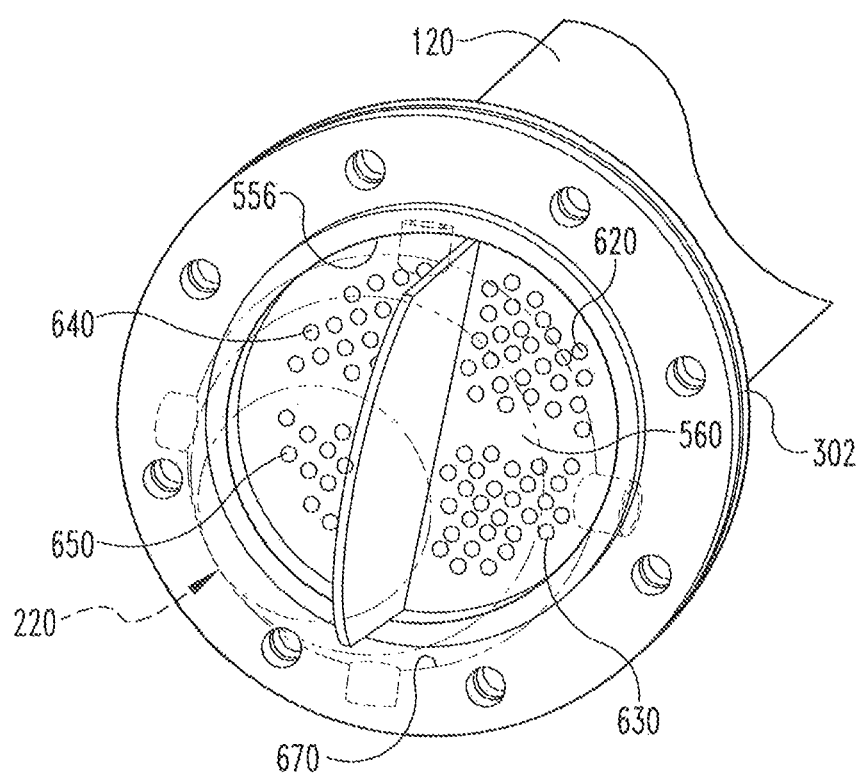
FIG. 9 is a perspective view of a distal end of the heat exchanger of FIG. 7 with a dome cover shown in phantom so that a partition plate used to separate a high pressure flow from a low pressure flow can be viewed.

Referring now to FIGS. 7, 8 and 9 perspective views of the heat exchanger 120 with the dome cover 220 are illustrated. The heat exchanger 120 includes a housing 550 with an internal bore 556 extending between the first end 292 and the second end 302. The internal bore 556 can be separated into four sections with a first partition wall 560 extending from one side to another of internal bore 556 and a second partition wall 570 extending between to a top and bottom of the bore 556 along the length of the heat exchanger 120. The first and second partition walls 560, 570 separate the internal bore 556 into a first section 580, a second section 590, a third section 600 and a fourth section 610. The sections 580, 590, 600 and 610 are similar in cross-sectional area to the quadrants 440, 450, 460 and 470 of the combination unit 110, and as such may vary in orientation, position and size as explained above. The first section 580 includes a plurality of tubes 620 for transporting the low pressure compressed working fluid from the first end 292 to the second end 302 of the heat exchanger 120.

Coolant enters into the coolant inlet port 290 and exits through the coolant outlet port 300 and flows around the tubes 620 so as to remove heat from the low pressure stage compressor flow running through the tubes 620 in the first section 580 of the heat exchanger 120. The low pressure working fluid flows to the second end 302 of the heat exchanger 120 and into the region defined within the dome cover 220. The low pressure working fluid can impinge the dome cover 220 and return through a plurality of tubes 630 in the second section 590 in the opposite direction toward the first end 292.

The high pressure working fluid will flow through a plurality of tubes 640 in the third section 600 and into the dome region defined by the dome cover 220. Similarly to the low pressure flow, the flow of compressed working fluid from the high pressure stage compressor will return back to the first end 292 flow through a plurality of tubes 650 in the fourth section 610 to the heat exchanger 120 after entering the dome region. As the working fluid of the low pressure and high pressure stages flow through the tubes 620, 630, 640 and 650, a coolant chamber 652 surrounding the individual tubes 620, 630, 640 and 650 will cool the low pressure and high pressure working fluid.

A dome partition wall 660 operable to keep the low pressure working fluid from the high pressure working fluid separated is positioned between the heat exchanger 120 and the dome cover 220. The dome partition wall 660 extends from the second end 302 of the heat exchanger 120 to an inner dome wall 670 so as to prevent mixing of the low pressure and high pressure flow streams. The inner dome wall 670 acts as an abutment to facilitate a reversal of the flow direction of both the low pressure and high pressure flow within the dome region so that the low pressure and high pressure streams are turned and then flow back through the return tubes 630, 650.

Referring generally to FIGS. 1-9, the operation of the system 10 is described below. The discharge compressed working fluid flow from a low pressure compressor will enter into the first quadrant 440 through the low pressure stage inlet 240 of the combination unit 110. The first quadrant 440 includes an expansive volume to operate as a pressure dampener to reduce the pressure pulsations that are caused by operation of a screw compressor or other types of compressors. The flow of low pressure working fluid is directed into a plurality of tubes 620 in the first section 580 of the heat exchanger 120. The low pressure working fluid will be cooled in both the first section 580 as well as in the return section 590 of the heat exchanger 120. After exiting the heat exchanger 120, the low pressure working fluid will enter the second quadrant 450 of the combination unit 110. The low pressure working fluid will impinge on the baffles 500 and deflect in a tortuous path causing condensate to separate from the working fluid. The separated condensate will then drain into the condensation reservoir 280 and dehumidified low pressure working fluid will exit through the low pressure stage outlet 250 and then enter into the high pressure stage compressor.

A discharge flow of compressed working fluid from a high pressure compressor will enter into the third quadrant 460 through the high pressure stage inlet 260 of the combination unit 110. The third quadrant 460 includes an expansive volume to operate as a pressure dampener to reduce the pressure pulsations that are caused by operation of a screw compressor or other types of compressors. The flow of high pressure working fluid is directed into a plurality of tubes 640 in the third section 600 of the heat exchanger 120. The high pressure working fluid will be cooled in the third section 600 and in the return section 610 of the heat exchanger 120. After exiting the heat exchanger 120, the high pressure working fluid will enter the fourth quadrant 470 of the combination unit 110. The high pressure working fluid will impinge on the baffles 500 and deflect in a tortuous path causing condensate to separate from the working fluid. The separated condensate will then drain into the condensation reservoir 280 and the dehumidified high pressure working fluid will exit through the high pressure stage outlet 270 for delivery to an end user. It should be noted that the quadrants and sections defined in the combination unit 110 and the heat exchanger 120 in the disclosed embodiment may be rearranged and located in different orientations in alternate embodiments.

In one aspect, the present disclosure includes a system comprising: a multi-stage compressor having a low pressure compressor stage and a high pressure compressor stage operable for compressing a working fluid; an integrated device including a heat exchanger directly connected to a combination unit; a first pressure pulsation dampener and a first moisture separator integrally formed within the combination unit, wherein the first pressure pulsation dampener and the first moisture separator are in fluid communication with a low pressure compressed working fluid discharged from the low pressure compressor stage; and a second pressure pulsation dampener and a second moisture separator integrally formed within the combination unit, wherein the second pressure pulsation dampener and the second moisture separator are in fluid communication with a high pressure compressed working fluid discharged from the high pressure compressor stage.

In refining aspects, the present disclosure the combination unit is formed as a single one-piece housing with an internal bore; further comprising first and second partition walls extending across the internal bore, the first and second partition walls intersecting one another within the internal bore; wherein the first and second partition walls cooperate to define a first quadrant, a second quadrant, a third quadrant and a fourth quadrant fluidly isolated from one another within the internal bore of the combination unit; wherein the first and second partition walls cooperate to define a first quadrant, a second quadrant, a third quadrant and a fourth quadrant fluidly isolated from one another within the internal bore of the combination unit; further comprising a first inlet port connected to the housing configured to provide a fluid ingress conduit for the compressed fluid discharged from the low pressure compressor stage into the first pressure pulse dampener; and a second inlet port connected to the housing configured to provide a fluid ingress conduit for the compressed fluid discharged from the high pressure compressor stage into the second pressure pulse dampener; a condenser reservoir formed with the unitary housing in fluid communication with the first and second moisture separators; and a separator plate positioned within the condenser reservoir configured to prevent mixing of the low pressure flow and the high pressure flow; wherein the heat exchanger is defined by a first sector, a second sector, a third sector and a fourth sector, each of the sectors having a plurality of tubes extending between a first end and a second end of the heat exchanger; wherein the heat exchanger is defined a first sector, a second sector, a third sector and a fourth sector, each of the sectors having a plurality of tubes extending between a first end and a second end of the heat exchanger; wherein a low pressure passageway is configures to direct low pressure compressed working fluid through the tubes in the first sector from the first end to the second end of the heat exchanger, impinge on the dome cover and reverse direction into the tubes in the second sector; a high pressure passageway is configures to direct high pressure compressed working fluid through the tubes in the third sector from the first end to the second end of the heat exchanger, impinge on the dome cover and reverse direction to flow into the tubes in the second sector; and wherein the dome partition plate is positioned between the low pressure passageway and the high pressure passageway; and further comprising a first outlet port connected to the housing configured to provide a fluid egress conduit for the low pressure compressed working fluid discharged from the first moisture separator; and a second outlet port connected to the housing configured to provide a fluid egress conduit for the high pressure compressed working fluid discharged from the second moisture separator.

In another aspect, the present disclosure includes an apparatus comprising: a first pressure pulsation dampener and a first moisture separator defined within a unitary housing; a second pressure pulsation dampener and a second moisture separator defined within the unitary housing; a low pressure inlet port connected to the unitary housing to provide a fluid conduit between a discharge flow of a low pressure compressor and the first pressure pulsation dampener; a high pressure inlet port connected to the unitary housing to provide a fluid conduit between a discharge flow of a high pressure compressor and the second pressure pulsation dampener; a low pressure outlet port connected to the unitary housing to provide an egress conduit from the first moisture separator; and a high pressure outlet port connected to the unitary housing to provide an egress conduit from the second moisture separator.

In refining aspects, the present disclosure includes an apparatus further comprising first and second partition walls extending across and intersecting within an internal bore of the unitary housing; wherein the first and second partitions form four separate quadrants within the internal bore; a first quadrant of the four quadrants includes the first pressure pulse dampener; a second quadrant of the four quadrants includes the first moisture separator; a third quadrant of the four quadrants includes the second pressure pulse dampener; and a fourth quadrant of the four quadrants includes a second moisture separator; a heat exchanger connected to the unitary housing having first and second flowpaths; wherein the first flowpath is configured to receive flow of low pressure working fluid from the first pressure pulse dampener, cool the flow of the low pressure working fluid and discharge the flow of low pressure working fluid into the first moisture separator; and wherein the second flowpath is configured to receive a high pressure flow of working fluid from the second pressure pulse dampener, cool the high pressure flow of working fluid and discharge the high pressure flow into the second moisture separator; a dome cover connectable to the heat exchanger at an end opposite of the unitary housing; and a partition plate positioned between the dome cover and the heat exchanger to prevent mixing of the low pressure flow and the high pressure flow; wherein the first flowpath and the second flowpath of the heat exchanger reverse direction after impingement with the dome cover; each of the first and second flowpaths are defined by a plurality of tubes positioned within a coolant chamber of the heat exchanger; each of the first and second moisture separators include one or more baffle plates positioned therein; and further comprising a condenser reservoir formed with the unitary housing in fluid communication with the first and second moisture separators.

In yet another aspect, the present disclosure includes a method comprising: compressing a working fluid into a low pressure working fluid with a low pressure compressor; flowing the low pressure working fluid into a first pressure pulsation dampener located in a first quadrant of a combination housing; flowing the low pressure working fluid in a first direction into a first flowpath between first and second ends of a heat exchanger; impinging the low pressure working fluid onto a dome cover at the second end of the heat exchanger; reversing a flow direction of the low pressure working fluid and directing the low pressure working fluid back to the first end of the heat exchanger; directing the flow of the low pressure working fluid from the heat exchanger into a first moisture separator located in a second quadrant of the combination housing; discharging the low pressure working fluid from the first moisture separator to an inlet of a high pressure compressor; compressing the low pressure working fluid into a high pressure working fluid with a high pressure compressor; flowing the high pressure working fluid into a second pressure pulsation dampener located in a third quadrant of the combination housing; flowing the high pressure working fluid in a first direction into a second flowpath between the first and second ends of the heat exchanger, impinging the high pressure working fluid onto the dome cover at the second end of the heat exchanger; reversing a flow direction of the high pressure working fluid and directing the high pressure working fluid back to the first end of the heat exchanger; directing the flow of the high pressure working fluid from the heat exchanger into a second moisture separator located in a fourth quadrant of the combination housing; and discharging the high pressure working fluid from the second moisture separator.

In refining aspects, the present disclosure includes a method further comprising: reducing pressure pulsations of the low pressure working fluid and high pressure working fluid in the first and third quadrants, respectively in the combination housing; and removing condensate from the low pressure working fluid and high pressure working fluid in the first and second moisture separators located in the second and fourth quadrants, respectively in the combination housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a first pressure pulsation dampener and a first moisture separator defined within a unitary housing;
a second pressure pulsation dampener and a second moisture separator defined within the unitary housing;
a low pressure inlet port connected to the unitary housing to provide a fluid conduit between a discharge flow of a low pressure compressor and the first pressure pulsation dampener;
a high pressure inlet port connected to the unitary housing to provide a fluid conduit between a discharge flow of a high pressure compressor and the second pressure pulsation dampener;
a low pressure outlet port connected to the unitary housing to provide an egress conduit from the first moisture separator;
a high pressure outlet port connected to the unitary housing to provide an egress conduit from the second moisture separator.

2. The apparatus of claim 1 further comprising first and second partition walls extending across and intersecting within an internal bore of the unitary housing.

3. The apparatus of claim 2, wherein the first and second partitions form four separate quadrants within the internal bore.

4. The apparatus of claim 3, wherein:
a first quadrant of the four quadrants includes the first pressure pulse dampener;
a second quadrant of the four quadrants includes the first moisture separator;
a third quadrant of the four quadrants includes the second pressure pulse dampener; and
a fourth quadrant of the four quadrants includes a second moisture separator.

5. The apparatus of claim 1 further comprising a heat exchanger connected to the unitary housing having first and second flowpaths;
wherein the first flowpath is configured to receive flow of low pressure working fluid from the first pressure pulse dampener, cool the flow of the low pressure working fluid and discharge the flow of low pressure working fluid into the first moisture separator; and
wherein the second flowpath is configured to receive a high pressure flow of working fluid from the second pressure pulse dampener, cool the high pressure flow of working fluid and discharge the high pressure flow into the second moisture separator.

6. The apparatus of claim 5 further comprising:
a dome cover connectable to the heat exchanger at an end opposite of the unitary housing; and
a partition plate positioned between the dome cover and the heat exchanger to prevent mixing of the low pressure flow and the high pressure flow.

7. The apparatus of claim 6 wherein the first flowpath and the second flowpath of the heat exchanger reverse direction after impingement with the dome cover.

8. The apparatus of claim 5 wherein each of the first and second flowpaths are defined by a plurality of tubes positioned within a coolant chamber of the heat exchanger.

9. The apparatus of claim 1, wherein each of the first and second moisture separators include one or more baffle plates positioned therein.

10. The apparatus of claim 1 further comprising a condenser reservoir formed with the unitary housing in fluid communication with the first and second moisture separators.

* * * * *